Dec. 3, 1935.  T. SCHOU  2,023,245
FREQUENCY CHANGER
Filed March 23, 1933  3 Sheets-Sheet 1
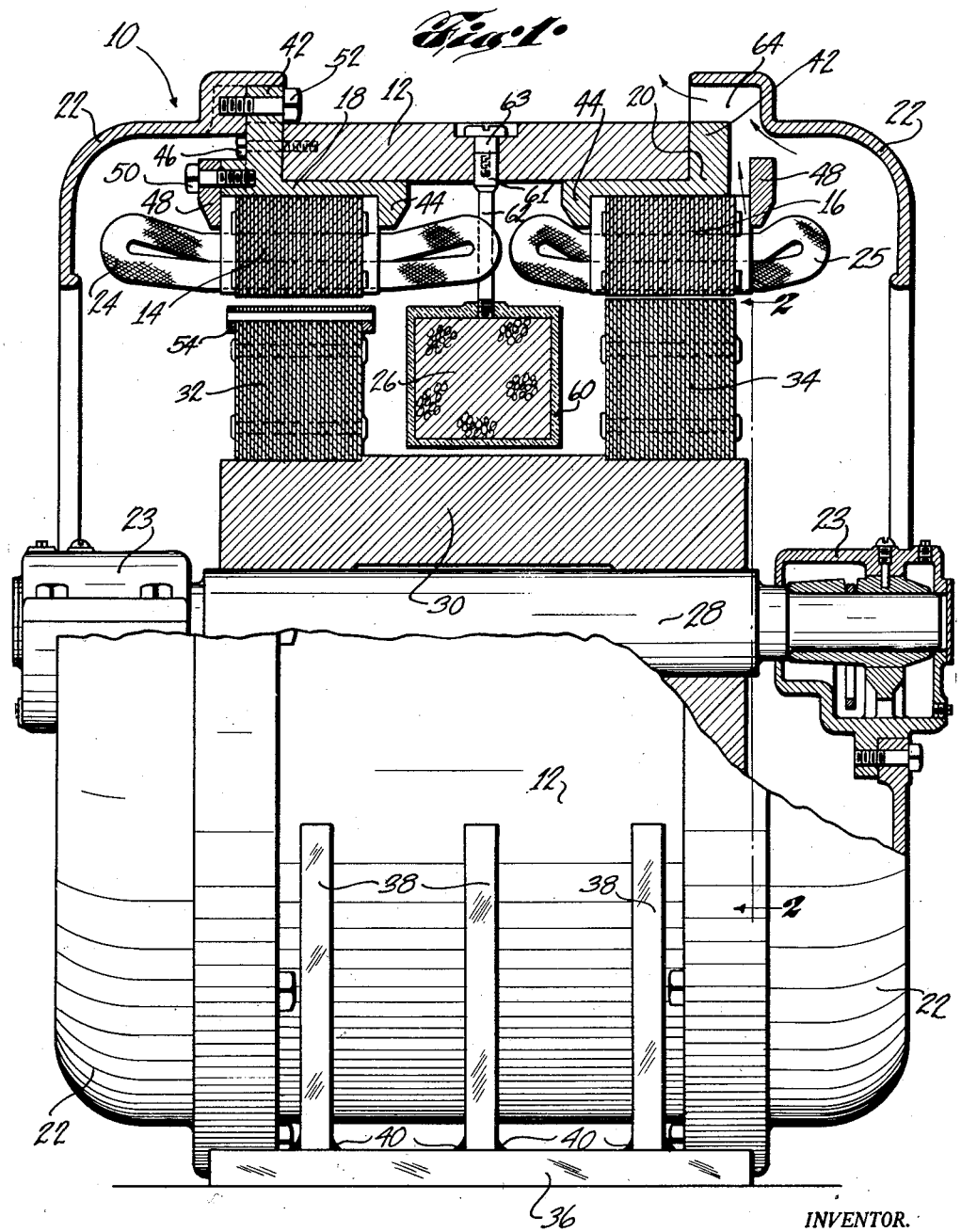
INVENTOR.
THEODOR SCHOU
BY
ATTORNEY.

Dec. 3, 1935.  T. SCHOU  2,023,245
FREQUENCY CHANGER
Filed March 23, 1933  3 Sheets-Sheet 2
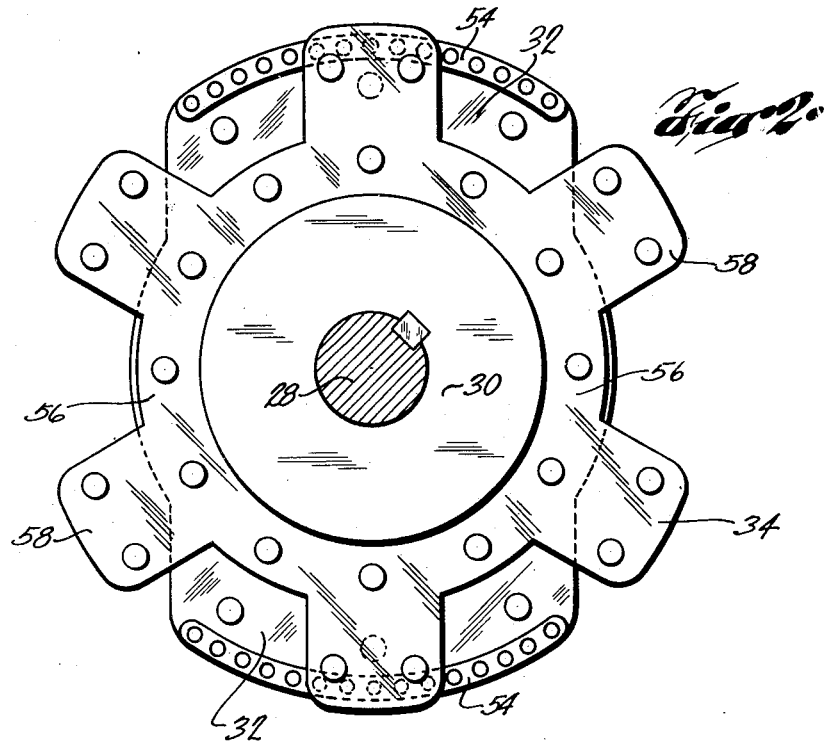
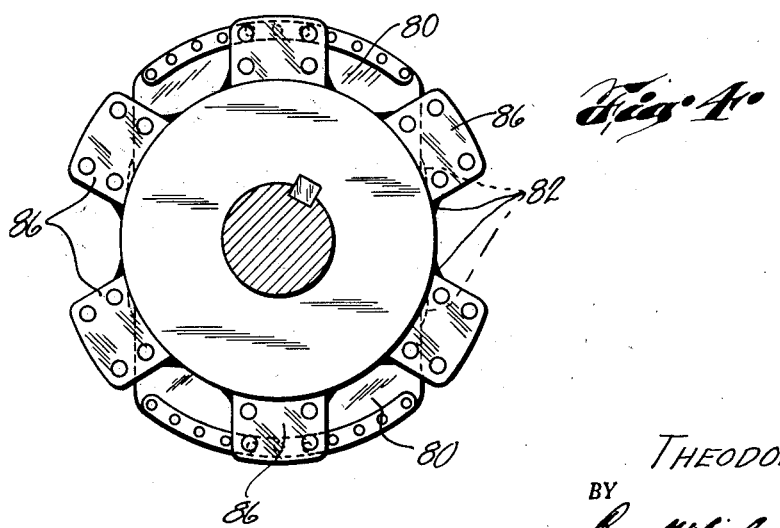
INVENTOR.
THEODOR SCHOU
BY
Roy McEilus
ATTORNEY.

Dec. 3, 1935.　　　　T. SCHOU　　　　2,023,245
FREQUENCY CHANGER
Filed March 23, 1933　　　3 Sheets-Sheet 3
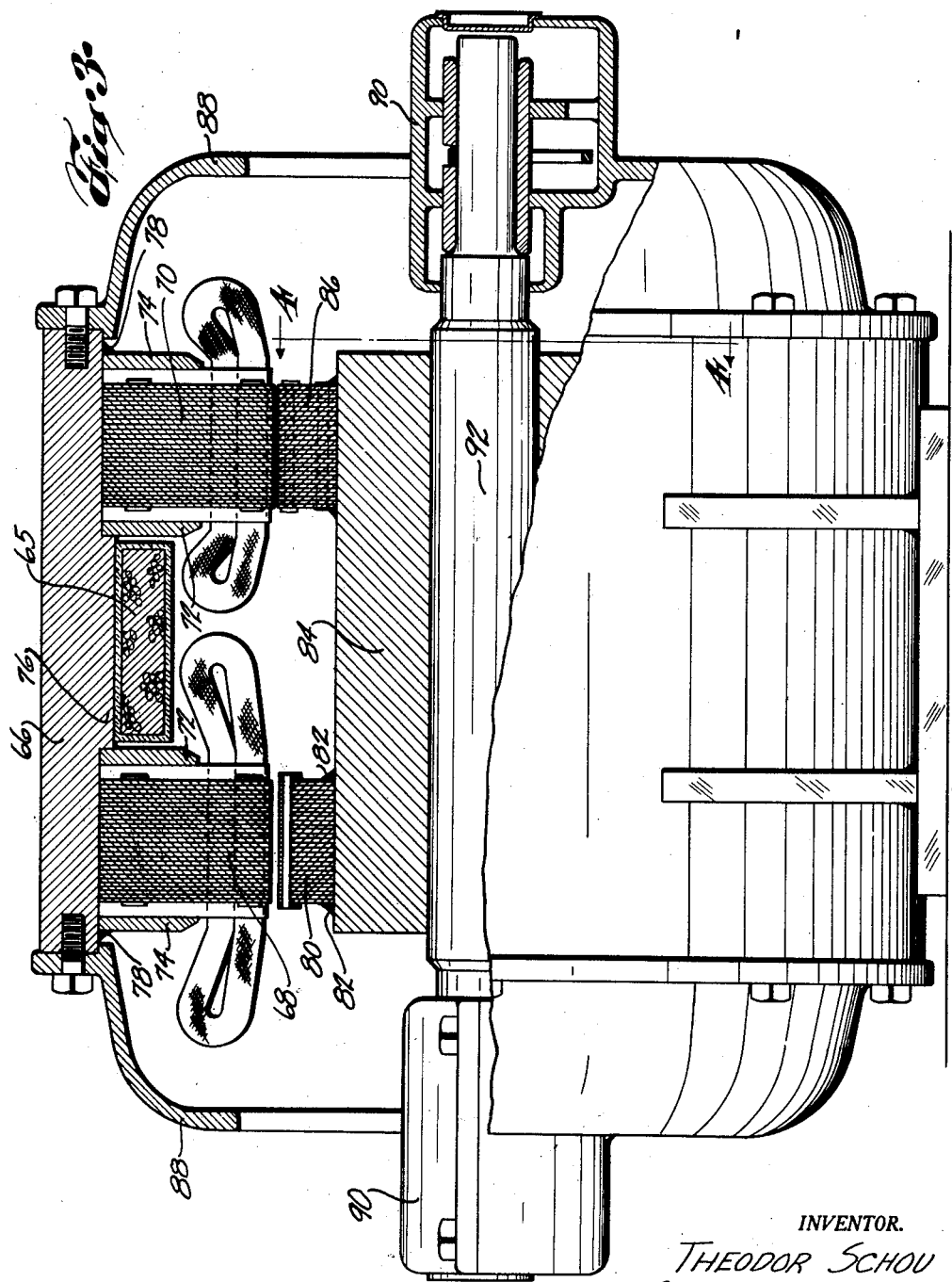
INVENTOR.
THEODOR SCHOU
BY
ATTORNEY.

Patented Dec. 3, 1935

2,023,245

UNITED STATES PATENT OFFICE 2,023,245

FREQUENCY CHANGER

Theodor Schou, Beloit, Wis., assignor to Fairbanks, Morse & Company, Chicago, Ill., a corporation of Illinois Application March 23, 1933, Serial No. 662,209

6 Claims. (Cl. 172—281)

This invention relates to synchronous type frequency changers, and more particularly to an improved frequency changer of inductor synchronous type, wherein the driving and driven elements, which heretofore have been separate, externally coupled units, are formed and assembled as a single, self-contained changer unit.

The synchronous type of frequency changer, employing a synchronous motor driving a synchronous generator or alternator, forms one of the most efficient frequency altering devices in use at the present time. Such machines are characterized by a steady and dependable operation, a feature which is of particular importance where high speed machines are to be supplied with power of a frequency higher than that of the available commercial power source. However, this type of frequency changer has not been used to any great extent, due principally to its high first cost. Hence, the synchronous frequency changer has been employed only where particular circumstances have required its use, as in high speed tool work where the operating motor of a machine tool must be supplied from a steady source of high frequency power.

The form of device heretofore most commonly employed for altering the frequency of a power source, is the induction type of frequency changer, usually consisting of an induction motor driving a second induction motor in a reverse direction of rotation. Although the induction type of changer is most economical in first cost and in operation, its operating characteristics render it far less desirable than the synchronous changer as a steady, dependable, and efficient frequency changing device. The voltage regulation of the induction apparatus is frequently very poor, and it is not at all uncommon to find marked variations in the frequency of the generated power source. A fluctuating frequency will generally cause an objectionable variation in speed of a motor operated from the frequency changer, and if such speed variation is sufficient to include the critical speed of the motor, serious trouble may result. This is particularly true in the case of high speed, machine tool-driving motors operated from induction frequency changers.

It is, therefore, an object of the present invention to provide a frequency changer which will substantially attain the operating characteristics of the older prevailing types of synchronous changer, hereinabove described, in respect to steadiness and dependability of operation, and yet compare favorably with the induction changer in the matter of initial and operating costs.

More specifically, the object is attained in the combination, in a single unit, of an inductor type synchronous motor and an inductor alternator.

Another object is attained in the provision of an improved inductor type synchronous frequency changer, in which the rotating elements of the motor and alternator are combined as a single rotating structure, operating within a single frame member and bearinged in no more than two bearing arms, one at each end of the frame, thereby eliminating coupling members between separate driving and driven machines, and obviating an extra machine frame and associated rotor bearing arms.

A further object is attained in the provision of an improved inductor synchronous frequency changer in which the armature and field windings are all stationary, thus eliminating all such rotor winding circuit connecting expedients as slip rings, brushes and brush holder frames, and so greatly simplifying the structure of the machine.

A still further object is attained in the provision of a sturdy and fool proof inductor synchronous frequency changer, in which the magnetic circuits of both the motor and alternator are or may be excited by a single field winding.

Yet another object is to provide an improved frequency changer of the inductor synchronous type, wherein certain parts are formed of a non-magnetic material or materials as an expedient for substantially reducing the large magnetic losses heretofore prevalent in the inductor type of machine.

Further objects and advantages will appear from the following description, and from the drawings, in which:

Fig. 1 is a longitudinal, fragmentary sectional elevation of an improved inductor synchronous frequency changer; Fig. 2 is an end elevation of the rotor, as viewed from line 2—2 in Fig. 1; Fig. 3 is a longitudinal, fragmentary sectional elevation of a modified form of the changer of Fig. 1, and Fig. 4 is an end elevation of the rotor of the modified machine, as viewed from line 4—4 in Fig. 3.

Referring, now, to the drawings by numerals of reference, 10 designates, generally, a preferred form of inductor synchronous frequency changes. The stationary portion of the machine includes an annular armature frame 12, armature core structures 14 and 16 seated, respectively, in core-holding rings or sleeves 18 and 20 abutting opposite end portions of the frame 12; bearing brackets or arms 22, each bracket supporting a bearing assembly and housing 23; armature windings 24 and 25 associated, respectively, with the core structures 14 and 16, and a field excitation winding 26. The rotor consists of a shaft 28 having its end portions journalled in the bearings 23; a spider or core member 30 preferably keyed to the central portion of the shaft; a series of peripherally spaced, laminated inductor field members 32 on one end of the core 30, in inductive relation with the armature core 14, and a second series of spaced inductor members 34 on the opposite end of the core 30, and in inductive relation with the armature core 16. The above recited elements of the machine are well recognized as old in the art, and as such, form of themselves, in a broad sense, no part of the present invention. The novelty of the present invention resides, in a substantial measure, in the combination of an inductor synchronous motor and an inductor alternator combined as a single, self-contained unit, presently to be described, and in the use of certain non-magnetic materials in the formation of several of the machine parts, such parts, for example, as the rotor shaft, bearing arms, and bearing assemblies.

Referring more specifically to the formation of certain of the above recited machine elements, the rotor shaft 28 is preferably formed of stainless steel, which is of such low permeability that it may be considered as non-magnetic in character, and which has been found in practice to substantially reduce magnetic losses through the shaft, as compared with shafting of ordinary mild steel or other magnetic metals. The several parts of the bearing assemblies 23 may be and preferably are formed of a non-magnetic material, such as aluminum alloy or brass, or from any other suitable non-magnetic material which is inexpensive, readily available, commercially, and of the requisite physical character. The bearing arms 22 are preferably aluminum alloy castings, aluminum alloy being used because of its excellent non-magnetic quality, and because of its cheapness, strength, and light weight. The use of such non-magnetic materials in the formation of the machine elements noted, results in a substantial decrease in the large magnetic leakage losses which, heretofore, have characterized synchronous machines of the inductor type. By so minimizing such leakage losses, the operating characteristics and general efficiency of the machine are materially improved.

The machine may be mounted upon any suitable foundation (not shown) by means of a base plate 36, and a plurality of frame-supporting feet or lugs 38 which, in the present example, are preferably formed integrally with the frame member 12. As shown, the base plate 36 may, if desired, be secured to the ends of the feet elements 38 by welding the feet thereto, as at 40, Fig. 1.

The armature core supporting rings or sleeves 18 and 20 are each provided with a radially extending, peripheral flange portion 42 abutting an end or edge portion of the frame 12, and a shoulder flange 44 disposed on the end of the ring which extends inwardly of the frame. The supporting members are preferably secured to the frame by means of bolts 46 extending through a portion of the flange 42 and into the frame ends. The armature core structure 14 is seated in the sleeve 18 with its inner end abutting the shoulder 44, and is held in place by an annular clamping or retainer member 48 which may be secured to the outer end of the sleeve 18, as by bolts 50. A like manner of assembly prevails with the core 16 and core seat 20. The bearing arms 22 may be secured to the frame 12 in any suitable manner such as by bolts 52 extending through portions of the flanges 42.

Fig. 2 illustrates the rotor structure as viewed from line 2—2 in Fig. 1. As shown, there are provided two laminated inductor field poles 32, disposed in diametrical opposition on one end of the spider member 30, and secured thereto by any suitable means. The poles 32 are in inductive relation with the armature core 14, and form with the armature winding 24 and field coil 26, an inductor type synchronous motor, being the impelling agency of the frequency changer unit. An amortisseur or damping winding 54 is supplied in the ends of the poles 32 for starting purposes, such a starting expedient being well known in the art.

A plurality of ring laminations 56, each provided with suitably spaced radial projections 58 thereon, are stacked and assembled on the opposite end portion of the rotor member 30. The projections, in the assembly of the laminations, form the inductor field poles 34, six such poles being provided in the present example. It will be understood of course that the number of inductor field poles in each of the rotor assemblies, is a matter of selection according to the ratio between the available input, and the desired output frequency. As may be readily observed in Fig. 1, the poles 34 are in inductive relation with the armature core structure 16, and form, with the armature winding 25 and field coil 26, a second inductor type synchronous motor which is adapted to be driven in reverse, as an inductor type synchronous generator or alternator.

The field coil 26 is preferably mounted in an insulated box-like case 60, which may be formed of micarta, or other similar insulating material possessing sufficient mechanical strength to support and protect the winding. The coil and case are preferably supported adjacent the rotor member 30 by a plurality of insulator mounting studs 61 secured in the frame member 12. It will appear that, in the form illustrated, the lower or shank portion 62 of each stud is formed of an insulating fibre, and the head portion 63 may be in the nature of a metal screw or bolt. It will be noted as preferred, that the single field winding serves to excite the magnetic circuit of both the motor and alternator. It is preferred, by reason of the mounting of the field windings between the two groups of rotor-carried inductor pole pieces, that the field winding housing structure be mounted so as to be detachable upon removal of the rotor. A preferred arrangement for this purpose consists of a series of wedge elements (not shown), to which are threadedly secured the ends 62 of the mounting studs, the wedge elements being slidably secured to the box structure 60. Thus the case or box containing the field windings, may be laterally removed, by sliding action, as the rotor is removed endwise of the frame. The details of this arrangement are fully disclosed and claimed in my copending application of Serial No. 662,210, filed March 23, 1933, the description thereof being incorporated herein by this reference.

Air ducts 64 are formed in the frame structure, at suitable intervals about the periphery of the machine, to provide for a constant flow of cooling air through the machine. A detailed description of the ducts need not be given here, as they are cooling expedients well known in the art.

Fig. 3 illustrates a modified form of the frequency changer of Fig. 1, according to which the field winding assembly 65, which may be similar to that of Fig. 1, and similarly enclosed, is mounted adjacent the armature frame 66. The armature core assemblies 68 and 70 are secured, in this instance, between clamping rings 72 and 74, the rings 72 abutting a spacing shoulder 76 preferably formed integrally with the frame 66, and the rings 74 being welded to the frame, as at 78, Fig. 3. Fig. 4 shows an end view of the rotor of the modified machine. The motor inductor poles 80, which correspond to the poles 32 of the machine of Figs. 1 and 2, are welded, as at 82, to a spider member 84, as are the poles 86. The latter poles of the modified machine are preferably separate structures, rather than integral parts of a single laminated structure, such as the elements 56 of Fig. 2. The bearing arm 88, bearing assemblies 90, and rotor shaft 92 may be formed substantially similar to the corresponding parts of the preferred machine of Fig. 1, and, in addition, are preferably formed of the same non-magnetic materials.

In the operation of the frequency changer, the machine elements 14, 24, 26 and 32 form an inductor synchronous motor which drives the changer unit or alternator, constituted by the machine elements 16, 25, 26 and 34, Fig. 1. A like arrangement obtains with the elements 65, 68, 80, and 65, 70, 86 in the machine of Fig. 3. In the presently preferred example of Fig. 1, the driving motor of the machine is adapted to operate from a source of power having a frequency of 60 cycles per second, and the alternator, driven by the motor, is adapted to deliver current at a frequency of 180 cycles per second, there being three times as many alternator field poles as motor field poles. A like result is obtained with the modified form of the machine, shown in Fig. 3. By altering the armature windings and the relative number of field poles of the motor and alternator, the machine may be adapted to deliver current at any desired frequency, such, for example, at 90, 120 or 300 cycles.

As before noted, the magnetic circuits of both the motor and alternator are excited by a single field winding, hence the high frequency of the alternator generated current will not fluctuate, providing the frequency of the current supplied to the motor remains constant. Likewise, since the same flux interlinks the armature windings of both the motor and alternator, the alternator voltage will remain substantially constant over a wide range of load, providing the voltage applied to the motor is constant.

The presently described inductor synchronous frequency changer forms a sturdy and reliable machine which has been found in use, to be far superior in operation to the heretofore more commonly employed induction frequency changer. Furthermore, the manufacturing cost of the presently improved synchronous machine compares favorably with the low cost of the induction machine, and in all other respects serves fully to attain each of the objectives heretofore enumerated.

It is to be understood that the invention is not limited by the specific forms of the presently described embodiments, as they may be altered or modified without departing from the spirit and full intended scope of the invention, as defined by the appended claims.

I claim:

1. In a frequency changer of inductor synchronous type, a stator, a rotor, a frame by which the stator is carried, the rotor embodying spaced groups of inductor pole pieces, the pole pieces differing in number in the adjacent groups, a tubular spider of magnetic metal bridging the pole pieces of the adjacent groups, and mounting means including a rotor shaft supporting said spider and formed of a non-magnetic steel, and bearing arms of non-magnetic, non-ferrous metal for operatively supporting the rotor with respect to the frame.

2. In a frequency changer of inductor synchronous type, a frame of magnetic metal, a plurality of stator assemblies carried by said frame, a rotor, a plurality of groups of field inductors on said rotor, a stationary field winding, means for supporting the field winding in non-magnetic relation to the frame, and means including a shaft for said rotor formed of non-magnetic steel, and bearing arms of a non-magnetic, non-ferrous metal rotatably supporting said shaft, one of said groups of field inductors being inductively associated with one of said stator assemblies, forming a driving motor for said machine.

3. In a frequency changer of inductor synchronous type, an annular frame member of magnetic metal, an armature assembly adjacent and within one end portion of said frame, a second armature assembly similarly disposed near the opposite end of the frame, a rotor assembly including a series of inductor field poles disposed in inductive relation with said first armature assembly, and a second series of poles disposed in inductive relation with said second armature assembly, one of said inductively related armatures and field pole series forming a motor, for driving the machine, a field winding, non-magnetic elements supporting the field winding within the frame member, a shaft of stainless steel forming a part of the rotor assembly, bearing arms and bearing structures for supporting said shaft, said bearing elements being formed of a non-magnetic, non-ferrous alloy.

4. An inductor type frequency changer including a frame of magnetic metal, a rotor, a non-magnetic shaft element of ferrous metal constituting a part of the rotor, groups of inductor pole pieces carried in spaced relation by the shaft, the pole pieces differing in number in adjacent groups, a structure magnetically bridging the groups of pole pieces, separate armature assemblies, each inductively associated with one of the groups of pole pieces, bearing arms of an aluminum alloy, supporting said shaft element to permit a relative rotation of the pole pieces and armature assemblies, a field winding, and non-magnetic means for supporting the field winding within the frame.

5. In a frequency changing machine of inductor synchronous type, a rotatable spider, separate groups of inductor pole pieces mounted on said spider, the pole pieces differing in number in adjacent groups, separate armature organizations, each associated with one of the groups of pole pieces, means for producing an exciting flux in said pole pieces, and metal elements of low permeability through which the pole pieces and armature organizations are associated for relative rotation, said elements including the combination of a shaft of stainless steel, and bearing arms formed of an aluminum alloy.

6. In a frequency changer of inductor synchronous type, a stationary annular frame, separate armature organizations mounted in spaced relation within, and each located near one end of said frame, bearing arms secured to the ends of said frame, bearing assemblies carried by said arms, the bearings and bearing arms being formed of a non-magnetic, non-ferrous metal, a shaft operable in said bearings, and formed of stainless steel, a spider secured in overlying relation to the shaft, spaced groups of inductor pole pieces of laminated construction, disposed near opposite ends of the spider, the pole elements differing in number in the said groups, an amortisseur winding carried by pole pieces of one of said groups, a stationary field winding so disposed as to produce an exciting flux in both groups of said inductor pole pieces, and means for supporting the field winding in non-magnetic relation to said frame.

THEODOR SCHOU.